United States Patent Office 2,727,028
Patented Dec. 13, 1955

2,727,028

TREATMENT OF WASTE SULPHITE LIQUOR AND PRODUCTS THEREOF

John K. Russell, David Craig, and Gerald J. Byrd, Quebec, Quebec, and Richard L. Maeder, East Angus, Quebec, Canada, assignors to Lignosol Chemicals Limited, Quebec, Quebec, Canada No Drawing. Application March 14, 1951,
Serial No. 215,632

8 Claims. (Cl. 260—124)

This invention relates to the treatment of waste sulphite liquor for the production of a new and useful product.

A general object of the invention is to provide a useful outlet for the abundant supply of used sulphite liquor available in pulp mills. A more specific object is to provide an improved method of treating such liquor whereby it may be more economically concentrated into a product adapted for use as a tanning agent and as an adhesive for various purposes.

Normal used sulphite liquor from the production of sulphite pulp may contain in the neighborhood of 8 to 14% solids, up to about 0.3% sulphur dioxide and up to about 1% of lime. In the concentration of such liquor by evaporation to increase the proportion of solids great difficulty and expense are involved, due primarily to the precipitation in the evaporator of lime salts, chiefly calcium sulphate, and some calcium sulphite. Attempts have been made to overcome this difficulty by installation of elaborate heat exchange equipment and by treatment under pressure at temperatures above the boiling point of the liquor in order to precipitate a portion of the lime salts present in the liquor but no completely satisfactory solution of the problem has yet been evolved.

The preparation of tanning extract from waste sulphite liquor involves the removal of a major portion of the lime salts which are undesirable because they form insoluble salts with certain of the vegetable tannins used in conjunction with sulphite liquor tanning extract and because tanning extracts containing appreciable amounts of lime salts tend to impart undesirable properties to leather in the course of the tanning. Lime is normally removed from sulphite liquor extracts by treating the concentrated liquor, at total solids concentrations of 50% or greater, with sufficient sulphuric acid to convert all the lime salts present to calcium sulphate and removal of the precipitated salt by filtration.

This process suffers from two drawbacks. In the first place calcium sulphate is soluble to an appreciable extent and subject to supersaturation which makes it difficult to remove down to the limit of its solubility with the result that extract prepared in this manner normally contains 0.2 to 0.3% lime as calcium oxide. In the second place, treatment of the liquor with relatively high concentrations of sulphuric acid leads to undesirable colour changes which are supposed to be due to local high concentrations of acid encountered during the mixing and to local high temperatures brought about by the high heat of solution of sulphuric acid. The presence of sulphuric acid or other strong acids in the tanning extract is also undesirable and even when partially neutralized with magnesia or other bases gives rise to undesirable qualities in the leather.

It has now been found that through the use of the method now to be described a tanning extract may be prepared which is virtually free from lime and which does not suffer from any of the undesirable qualities associated with the treatment with sulphuric acid and that the product obtained has new and valuable adhesive properties.

In addition the complete removal of calcium salts prior to evaporation yields a material which does not give rise to scaling and which may be evaporated without any fouling of the heat exchange surfaces.

The waste or spent sulphite liquor is treated with an alkali from the group consisting of ammonia and the hydroxides of ammonia, magnesium and sodium to precipitate all the lime in the liquor. The alkali is added in amount sufficient to neutralize the liquor to a pH not less than 6.5. If the proportions of sulphur dioxide and lime in the liquor, to be treated, are not substantially stoichiometric, sulphur dioxide is first added to provide a weight ratio of sulphur dioxide to lime of substantially 1.14. Waste sulphite liquor normally contains 0.5 to 1.0% lime as CaO and consequently a sulphur dioxide concentration of about 0.6 to 1.1% will be required for the complete removal of calcium ions from the liquor. In normal operation in the cooking of sulphite pulp the pressure on the digester is reduced at the end of the cook, the so-called "blow back" period, to about 20 p. s. i. which corresponds to a sulphur dioxide concentration of about 0.5% in the liquor. The sulphur dioxide in the relief gas is normally recovered and returned to the cooking acid system, generally in the acid accumulators. It is apparent that the required sulphur dioxide concentration in the waste liquor might be achieved through carrying the pressure relief only to the point where the liquor contained the required amount of sulphur dioxide. This however would require blowing at very high pressures and would require as well the provision of means for the rapid cooling, during the blow, of the total contents of the digester in order to prevent the loss of sulphur dioxide which would occur through flashing at high temperatures. It is preferable and simpler from the point of view of equipment and operation to add sulphur dioxide to the liquor, following recovery. This may be done through the absorption of gaseous sulphur dioxide in a tower packed with raschig rings or similar material, or other type of absorption tower, the liquor flowing downward counter-current against the upward flow of gas. The sulphur dioxide may also be added by means of sulphite or bisulphite salts, if alkalis giving soluble sulphites, such as ammonia or sodium hydroxide, are used.

The addition of the neutralizing agent, whether it be ammonia gas or one of the specified hydroxides, causes all of the lime to precipitate as insoluble crystals of calcium monosulphite. This is due to the conversion, at pH 6, of the highly soluble calcium bisulphite to the almost completely insoluble calcium monosuphite and to the formation of calcium monosulphite from the calcium ions in combination with lignin sulphonic and other organic acids and sulphuric acid, the place of the latter in these combinations being taken by the ammonium or other ions added in the course of the neutralization. The precipitated lime is now removed from the treated liquor by filtration, settling or the like. The precipitate consists mainly of the dihydrate of calcium sulphite, $$CaSO_3.2H_2O$$

and may be returned to the acid making system, preferably as a slurry in the sulphur dioxide absorption towers. In this way provision is made for the recovery and reuse of the sulphur dioxide added in the course of this treatment as well as of the lime and sulphur dioxide originally present in the liquor.

The colour and clarity of the evaporated liquor are important in a number of uses, in particular in tanning where a dark colour in the tanning agent will lead to undesirable colours in the tanned leather and in adhesives where for certain uses light coloured material is essential. The colour of liquors prepared by the present process is much better than that obtained in liquors prepared by the evaporation of untreated lime base waste liquor, but it has been found that under certain conditions the liquors suffer loss in colour during evaporation particularly if evaporation is carried out at temperatures appreciably higher than 100° C. or with temperatures at heat exchange surface higher than about 120° C. This is found especially in liquors which have been freed from lime by the use of ammonia but is also found to a lesser extent in liquors in which magnesia has been used as a deliming agent.

We have found however, that marked improvement in the colour of the liquors, even under ideal conditions of evaporation, may be obtained if, following the removal of the precipitated calcium sulphite and prior to the evaporation, the liquor is treated with sufficient sulphur dioxide to bring the pH to 1.5. The level of the pH is critical in that with the addition of sulphur dioxide to higher pH range of, say, 2.0 or 2.5 the improvement in colour is not permanent but reversion to the original colour occurs when the pH is again raised either through the loss of sulphur dioxide during evaporation or through neutralization with alkaline materials. On the other hand decreasing the pH to 1.5 brings about a permanent improvement in colour which is not lost when the pH is increased to 5 or higher. The temperature during evaporation at which undesirable changes in colour, viscosity and other characteristics occur, is also materially increased.

The so treated liquor is now evaporated to increase its solid content to the desired proportions, i. e. at least 50%, preferably 55%. No objectionable deposition of scale or fouling of the heating surfaces of the evaporator takes place.

The process outlined above may also be used to advantage in the so-called magnesia base pulping process in which pulping is carried out with magnesium bisulphite solutions and the waste liquor evaporated and burned for the recovery of sulphur dioxide and magnesia. Magnesia base liquors are used in the process because of the fact that magnesium sulphite and bisulphite on burning are converted completely to magnesium oxide and sulphur dioxide while calcium sulphite is converted to a mixture of calcium sulphite and calcium oxide with consequent loss of sulphur.

The process suffers from two disadvantages, one—that the small amounts of lime present in the wood tend to accumulate in the recycled reagent and may only be lost through precipitation as calcium sulphate or other insoluble salt, and two—that because of the necessity of keeping the proportion of calcium compounds to a minimum, magnesia of high purity must be used as make-up for the losses in the system. The necessity of using high purity magnesia adds considerably to the cost of operation, while the presence of appreciable amounts of lime as calcium sulphate, the sulphate ions being unavoidably present because of the oxidation of small amounts of sulphur dioxide, leads to scaling of the heat exchange surfaces and difficulties in evaporation.

These difficulties may be overcome if, following the separation of the waste liquor from the pulp, sufficient magnesia is added to raise the pH to 6–7. The sulphur dioxide content having been previously adjusted to correspond to the stoichiometric equivalent of the lime present and the resulting precipitate removed by settling or by filtration. Since the liquor is now free from calcium salts no difficulties will be encountered during evaporation. As a further advantage low cost magnesia containing appreciable amounts of lime may now be used as make-up in the subsequent cooking liquor preparation since a means for the removal of undesirable lime has been provided. It is true that a certain amount of sulphur, which may be difficult to recover has been removed from the system in the form of calcium monosulphite but the cost of this is more than made up for in the lower cost of make-up magnesia.

The following examples will illustrate the operation of the method of the invention.

(1) Used or waste sulphite liquor containing 10% solids was treated with sulphur dioxide gas until it had a pH of 1.5 and a sulphur dioxide content of about 1.00%. Gaseous ammonia was then passed into the liquor to change the pH to 7.5 and precipitate the lime as the insoluble salt which was then removed by filtration. The filtrate contained only 0.0001% lime as CaO. Upon evaporation of the liquor to a total solids content of 50% no deposition of solids appeared on the evaporator walls.

(2) Sulphite liquor containing 0.88% of lime as CaO, 0.75% of sulphur dioxide and having a pH of 1.8 was treated with finely divided magnesium oxide to change the pH to 6.5 and precipitate the lime which was removed by filtration and the filtrate was found to be free from lime. When it was concentrated no solids deposited on the evaporator walls.

(3) A solution of ammonium sulphite was added to sulphite liquor containing 1.0% of lime as CaO and 0.2% sulphur dioxide to increase the sulphur dioxide content to substantially 1.14%. Gaseous ammonia was passed into the solution to bring the pH to 6.5 and precipitate the lime. The precipitate was removed by filtration. The filtrate was effectively free from lime and no scale formed in the evaporator when the liquor was concentrated to 55% solids.

In each of the examples when sulphur dioxide was added to change the pH of the filtrate to about 1.5 the colour of the lime-free liquor was improved as well as its stability to heat treatment.

The concentrated liquor produced by the method is effectively free from lime, normally containing not more than 0.0001% of both free and combined lime, and contains not less than 30% but not more than 60% of lignosulphonate of one of a group consisting of ammonia, magnesium and sodium, depending upon the solids contents of the product. The total solids content of the product may be varied as desired but it is usually not less than 50% and the product may be a dry powder. It is particularly useful as a tanning agent for leather. It is also useful as an adhesive or bonding agent. For the latter purpose magnesia is the preferred neutralizing agent. The improved properties of the product appear to be attributable to the practically complete removal of the lime from the liquor before it is concentrated.

By the close control of the ratio of sulphur dioxide to lime in the liquor to be treated and of the pH of the solution upon neutralization with ammonia or the hydroxides the lime is readily eliminated.

We claim:

1. A method of treating waste sulphite liquor which comprises adding sulphur dioxide to the liquor to provide therein substantially equimolar proportions of sulphur dioxide and lime, adding one of a group consisting of ammonia, ammonium hydroxide, magnesium hydroxide and sodium hydroxide to neutralize the liquor to a pH not less than 6.5, removing the crystalline calcium monosulphite formed, and concentrating the liquor.

2. A method of producing useful products from waste sulphite liquor which comprises adding sulphur dioxide to the liquor to adjust the sulphur dioxide and lime content of the liquor to substantially equimolar proportions, neutralizing the liquor to a pH of not less than 6.5 with ammonia to precipitate all the lime, removing the precipitate and concentrating the liquor to at least 50% solids.

3. A method as defined in claim 1 wherein after removing the precipitate the liquor is treated with sulphur dioxide to change its pH to about 1.5 to improve the colour and stability of the product.

4. Concentrated waste sulphite liquor, substantially free from free and combined lime, and the solids thereof containing about 60% of a ligno-sulphonate of one of a group consisting of ammonium magnesium and sodium when prepared by the method defined in claim 2.

5. A method of producing useful products from waste sulphite liquor which comprises adding sulphur dioxide to the liquor to provide therein a weight ratio of sulphur dioxide to lime of substantially 1.14, adding one of a group consisting of ammonia, ammonium hydroxide, magnesium hydroxide and sodium hydroxide to change the pH of the liquor to not less than 6.5, and removing the insoluble precipitate so formed to free the liquor from free and combined lime.

6. The method defined in claim 5 wherein sulphur dioxide is added to the lime-free liquor to change its pH to substantially 1.5.

7. The method defined in claim 5 wherein the lime-free liquor is concentrated by evaporation to increase its lignosulphonate content.

8. As a new product concentrated waste sulphite liquor, substantially free from free and combined lime and containing not less than 30 nor more than 60% of ammonia lignosulphonate when prepared by the method defined in claim 5.

References Cited in the file of this patent

UNITED STATES PATENTS

| | | |
|---|---|---|
| 1,063,428 | Gianoli | June 3, 1913 |
| 1,551,882 | Howard | Sept. 1, 1925 |
| 1,685,800 | Baker | Oct. 2, 1928 |
| 1,747,047 | Bradley | Feb. 11, 1930 |
| 1,936,250 | Limburg | Nov. 21, 1933 |
| 2,057,117 | Sandborn | Oct. 13, 1936 |
| 2,104,701 | Sandborn | Jan. 4, 1938 |
| 2,200,784 | Wallace | May 14, 1940 |
| 2,242,601 | Wallace | May 20, 1941 |
| 2,317,832 | Vorsatz | Apr. 27, 1943 |
| 2,334,621 | Goodell | Nov. 16, 1943 |
| 2,541,058 | Heritage | Feb. 13, 1951 |
| 2,556,333 | Moser | June 12, 1951 |
| 2,559,305 | Mangold | July 3, 1951 |

FOREIGN PATENTS

| | | |
|---|---|---|
| 17,956 | Great Britain | of 1908 |

OTHER REFERENCES

Hatch: "Recovery of Chemicals and Energy in the Sulphite Process Through the Use of Magnesium as a Base," "Pulp and Paper Magazine of Canada, December 1947, pages 85–7.

Kolosov in Chem. Abst., 41, 1862 (1947).

British Intelligence Report No. 157, pages 1–4.